US010009983B2

(12) United States Patent
Noesner

(10) Patent No.: US 10,009,983 B2
(45) Date of Patent: Jun. 26, 2018

(54) NETWORKING GROUPS OF PHOTOCONTROL DEVICES

(71) Applicant: ABL IP Holding LLC, Decatur, GA (US)

(72) Inventor: Kevin Ernest Noesner, Dublin, OH (US)

(73) Assignee: ABL IP Holding LLC, Atlanta, GA (US)

( * ) Notice: Subject to any disclaimer, the term of this patent is extended or adjusted under 35 U.S.C. 154(b) by 153 days.

(21) Appl. No.: 15/180,625

(22) Filed: Jun. 13, 2016

(65) Prior Publication Data
US 2016/0381768 A1 Dec. 29, 2016

Related U.S. Application Data

(60) Provisional application No. 62/183,905, filed on Jun. 24, 2015.

(51) Int. Cl.
*H05B 37/02* (2006.01)
*H04W 12/06* (2009.01)
(Continued)

(52) U.S. Cl.
CPC ........ *H05B 37/0272* (2013.01); *H04W 76/14* (2018.02); *H05B 37/0218* (2013.01);
(Continued)

(58) Field of Classification Search
CPC ............ H05B 37/0272; H05B 37/0218; H05B 37/0227; H04W 8/005; H04W 12/06; H04W 76/023
See application file for complete search history.

(56) References Cited

U.S. PATENT DOCUMENTS 7,345,270 B1 * 3/2008 Jones ................. H05B 37/0218
250/214 AL
9,204,523 B2 12/2015 Reed et al.
(Continued)

OTHER PUBLICATIONS

Notice of Allowance for U.S. Appl. No. 14/748,659, "Notice of Allowance", dated Sep. 13, 2016, 9 pages.
(Continued)

*Primary Examiner* — Douglas W Owens
*Assistant Examiner* — James H Cho
(74) *Attorney, Agent, or Firm* — Kilpatrick Townsend & Stockton LLP

(57) ABSTRACT

Disclosed are various techniques for lighting control of groups of light fixtures by a remote device. The remote device receives, via a wireless network interface, an identifier from a photocontrol device that manages light output of the light fixture. The remote device transmits a request to establish a point-to-point communication session directly with the photocontrol device using the wireless network interface. Upon establishing the communication session, the remote device receives a list of photocontrols discovered by the photocontrol device via the photocontrol network. In response to input received, via a user interface of the remote device, to adjust a dimming schedule for a group of the photocontrols, the remote device instructs the photocontrol device to transmit, via the photocontrol network, an adjustment to a configuration for the group.

20 Claims, 7 Drawing Sheets

(51) Int. Cl.
*H04W 76/14* (2018.01)
*H04W 84/18* (2009.01)

(52) U.S. Cl.
CPC ............ *H04W 12/06* (2013.01); *H04W 84/18* (2013.01); *Y02B 20/46* (2013.01)

(56) References Cited

U.S. PATENT DOCUMENTS

| | | |
|---|---|---|
| 9,338,862 B2 | 5/2016 | Noesner et al. |
| 2002/0009975 A1* | 1/2002 | Janusz .................... H04Q 9/00 455/73 |
| 2004/0124786 A1* | 7/2004 | Morrissey, Jr. .... H05B 37/0218 315/291 |
| 2012/0044350 A1 | 2/2012 | Verfuerth |
| 2013/0342131 A1 | 12/2013 | Recker et al. |
| 2014/0103819 A1 | 4/2014 | Mohan |
| 2015/0332586 A1* | 11/2015 | Hamm ................... G08C 17/02 340/12.5 |
| 2015/0373815 A1* | 12/2015 | Patton ................. F21V 33/0052 315/297 |
| 2015/0382434 A1 | 12/2015 | Noesner et al. |
| 2015/0382435 A1 | 12/2015 | Noesner |
| 2016/0192461 A1* | 6/2016 | Minsky .............. H05B 37/0281 315/294 |

OTHER PUBLICATIONS

Notice of Allowance for U.S. Appl. No. 14/314,287, dated Jan. 14, 2016, 8 pages.
Non-Final Office Action for U.S. Appl. No. 14/748,659, dated Mar. 10, 2016, 13 pages.
Office Action for Canadian Patent Application No. CA 2,932,986, dated May 1, 2017, (3 pages).

* cited by examiner

NETWORKING GROUPS OF PHOTOCONTROL DEVICES

CROSS-REFERENCE TO RELATED APPLICATIONS

This application claims priority to U.S. Provisional Application No. 62/183,905 filed Jun. 25, 2015, the contents of which are incorporated herein by reference.

BACKGROUND

Lighting systems may be deployed to provide lighting for various environments such as parking lots, roadways, sidewalks, structures, etc. In some of these environments, the illumination from the fixtures may be managed by photocontrols that adjust the amount of light produced based upon the amount of ambient light detected by the photocontrol. For example, a photocontrol placed outside may switch off light output from the light fixture during daylight hours and switch on the light output during the evening.

However, changing the programming of these photocontrols to, for example, modify the light output level or temporarily switch on the light, may be a complicated task. To accomplish the task, a user often needs to have physical access to the photocontrol, which may be installed in a location that is difficult to access, such as atop a 40-ft. light pole. The difficulty can be magnified when there are many photocontrols which need to be adjusted.

SUMMARY

Various aspects of the present invention relate to configuring groups of photocontrol devices to manage light output of respective light fixtures through use of a radio frequency (RF) remote control device. The remote device receives, via a wireless network interface, an identifier from the photocontrol device within range of the wireless network interface of the remote device. The wireless network interface may use Bluetooth®, Wi-Fi®, and/or other possible protocols. The photocontrol device may be removably attached to the light fixture. The remote device transmits, via the wireless network interface, a request to establish a point-to-point communication session directly with the photocontrol device using the wireless network interface. The request may include an authentication credential.

Upon receiving, via the wireless network interface, an acknowledgement from the photocontrol device confirming establishment of the communication session, the remote device uses the established communication session to receive a list of photocontrols from the photocontrol device that were discovered via a photocontrol network. The lists specifies identifiers and group assignments for the photocontrols that manage light output of respective light fixtures. In response to input received, via a user interface of the remote device, to adjust a dimming schedule for a group of the photocontrols, the remote device instructs the photocontrol device to transmit an adjustment, via the photocontrol network, to a configuration for the group of the photocontrols based on the received input. The configuration for the group specifies the dimming schedule for the photocontrols that are members of the group.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
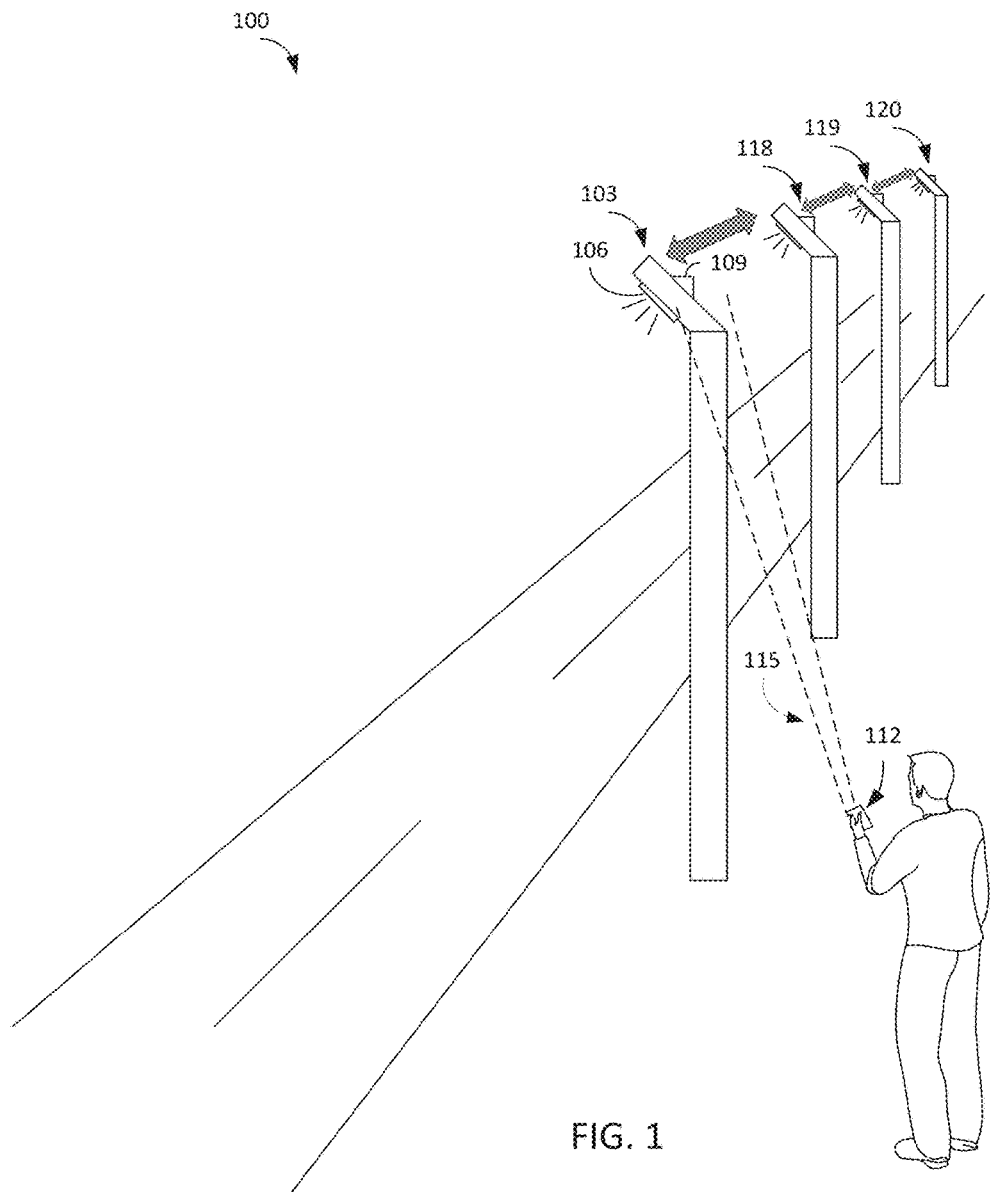
FIG. 1 is a drawing of an exemplary lighting environment according to various embodiments of the present disclosure.

Embodiments of the present invention are generally directed to a radio frequency (RF) remote control device for configuring groups of photocontrols to manage light output of respective light fixtures. With reference to FIG. 1, shown is an exemplary lighting environment 100. The lighting environment 100 includes various lighting fixtures, including the light fixture 103, for illuminating objects in the lighting environment 100, such as the roadway shown in this illustrative example. The light fixture 103 may be affixed to a structure, such as the pole shown, and may include an illuminating element 106, a photocontrol device 109, and other possible components. The illuminating element 106 is capable of producing light output for illuminating objects in the lighting environment 100. The illuminating element 106 may be a light-emitting diode (LED), a fluorescent lamp, an incandescent lamp, and/or other possible light emitting device(s).

The photocontrol device 109 may be used to control the light output from the illuminating element 106 of the light fixture 103, where control of the light output may be determined using one or more inputs to the photocontrol device 109. The photocontrol device 109 for a given light fixture 103 may be a hard-wired component of the light fixture 103, may be attached to a standard receptacle on the light fixture 103, or may be located remotely from the light fixture 103. As an example, the receptacle may be a National Electrical Manufacturers Association (NEMA) multi-pin receptacle (e.g., 3, 5, or 7 pins) to which the photocontrol 109 may be removably attached.

The photocontrol device 109 may sense the ambient light in the local area and modify the light output of the light fixture 103 based on the amount of ambient light. For example, the photocontrol device 109 may be programmed to dim the illuminating element 106 for a light fixture 103 when the detected amount of light exceeds a threshold (e.g., during daylight), and to brighten the illuminating element 106 when the amount of light does not reach the threshold (e.g., during evening). Additionally, the photocontrol device 109 may modify the light output of the light fixture 103 based further on a programmed dimming schedule and/or input from one or more other sensors, such as an occupancy sensor, temperature sensor, etc.

The photocontrol device 109 may include one or more RF transceivers with which the photocontrol device 109 can discover other photocontrols within range of the RF transceiver and establish a network among the photocontrols. In some implementations, the photocontrol 109 can identify and communicate with photocontrols that are outside the range of its RF transceiver by using other photocontrols that are within range to forward communications between them. The protocols supported by the RF transceivers may include Wi-Fi®, ZigBee®, Z-Wave®, Bluetooth®, Insteon®, other protocols from the IEEE 802.11 or 802.15 family of standards, and/or other possible communications protocols as can be appreciated. In some implementations, the photocontrol device 109 includes one or more credentials with which it may identify other photocontrols under the same administrative control and with which other photocontrols can identify the administrative control of the photocontrol 109.

In addition to communicating with other photocontrols, the photocontrol device 109 may also receive input from a remote device 112 via a wireless network interface (e.g., a Bluetooth® Low-Energy (BLE) network interface). In some implementations, the communication session may be "point-to-point," defined herein to mean a direct communication session between the remote device 112 and the photocontrol 109, without the use of intermediate network devices (e.g., network routers, switches, etc.). In various implementations, the wireless network interface of the photocontrol 109 is implemented as part of the RF transceiver.

The lighting environment 100 illustrates a communication scenario in which the photocontrol 109 is part of a network of photocontrols, while a remote device 112 establishes a network 115 with the photocontrol 109 via a Bluetooth Low Energy (BLE) connection. After establishing a communication session over a network 115 between the remote device 112 and photocontrol 109, the remote device 112 may use the communication session to send commands to modify the configuration of one or more photocontrols, individually or in groups, that may be reachable via the photocontrol network accessed by the RF transceiver of the photocontrol 109. The photocontrol 109 may discover and communicate with other photocontrols that are reachable either directly or through one or more intermediate hops (e.g., other photocontrols). For example, using the network 115 with the photocontrol 109, the remote device 112 may reconfigure the photocontrols 109, 118-120 to be assigned to the same group of photocontrols, such that a configuration change sent to the group can be transmitted to all members of the group by the network of photocontrols.

Figure 2:
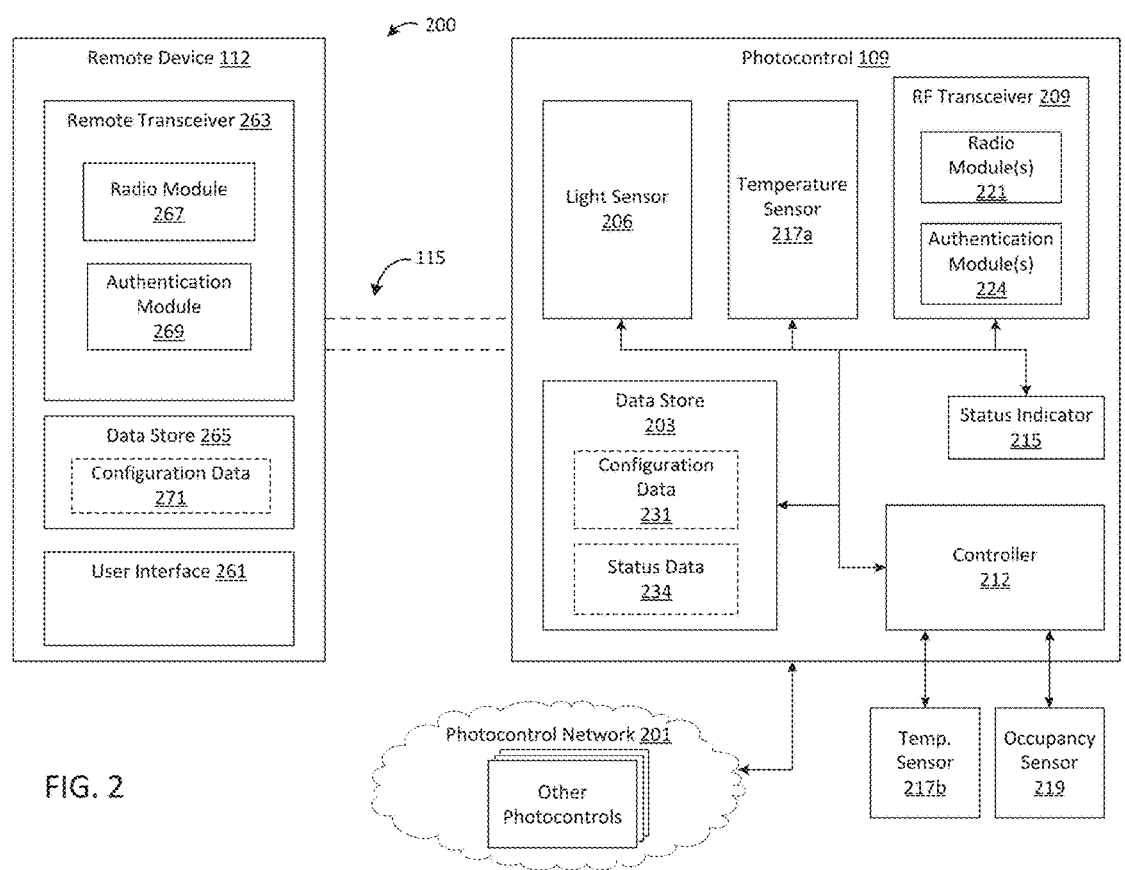
FIG. 2 is a drawing of a remote communication scenario that may occur in the lighting environment according to various embodiments of the present disclosure.

With reference to FIG. 2, shown is an exemplary remote communication scenario 200 that may occur in the lighting environment 100 according to various embodiments. This remote communication scenario 200 includes the photocontrol 109 and the remote device 112, which are in data communication with each other via the network 115. The photocontrol 109 may further be in communication with one or more other photocontrols, such as the photocontrols 118-120, via the photocontrol network 201. The network 115 and photocontrol network 201 can include wireless networks such as may be defined by Bluetooth® (including BLE), ZigBee®, Z-Wave®, Insteon®, other protocols from the IEEE 802.11 or 802.15 family of standards, and/or other possible communications protocols as can be appreciated. For example, the photocontrol network 201 can be organized into a star or mesh network configuration based on these protocols and standards.

The photocontrol 109 comprises a device to control the light output from one or more associated light fixtures. Alternatively, the photocontrol 109 can represent a plurality of such devices which may be in communication with the remote device 112. Various functionality may be executed in the photocontrol 109 according to various embodiments. Also, various data is stored in a data store 203 that is accessible to the photocontrol 109. The data store 203 may be representative of a plurality of data stores 203 as can be appreciated. The data stored in the data store 203, for example, is associated with the operation of the various functional entities described below.

The components included on the photocontrol 109, for example, include a light sensor 206, an RF transceiver 209, a controller 212, a status indicator 215, as well as possibly a temperature sensor 217a and/or other components or functionality not discussed in detail herein. In some implementations, the photocontrol 109 is in communication with components external to the photocontrol 109, such as a temperature sensor 217b, an occupancy sensor 219, and/or other possible components. The components of the photocontrol 109 may communicate using DALI™ (digital addressable lighting interface), a data bus, and/or other possible protocols. The light sensor 206 reports the amount of ambient light that it detects, which the photocontrol 109 may use as an input or factor for determining a level of light output (also referred to as "brightness") from the associated light fixture. The RF transceiver 209 facilitates both establishing the network 115 with a remote device 112 through which commands can be received for the photocontrol 109 and participating in the photocontrol network 201 through which the photocontrol 109 sends/receives data from other photocontrols. Some of the commands received from the remote device 112 may be instructions for modifying the configuration that the photocontrol 109 and/or other photocontrols use for determining a level of light output from a light fixture, as well as other possible purposes.

The RF transceiver 209 comprises a radio module 221, an authentication module 224, and other possible components. The radio module 221 is representative of one or more radio modules that provide a wireless network interface to facilitate establishing the network 115 using a radio frequency (RF) communication link with the remote device 112, as well as one or more wireless network interfaces for communicating in the photocontrol network 201. The authentication module 224 is representative of one or more authentication modules used to authenticate the remote device 112, authenticate the photocontrol 109 to other photocontrols, and/or authenticate other photocontrols to the photocontrol 109. The authentication may be carried out using an authentication protocol included in a protocol of the respective networks, such as a Bluetooth PIN, and/or may use other authentication protocols as can be appreciated. The authentication module 224 may use one or more credentials stored in the photocontrol 109 during the course of the authentication.

The controller 212 determines the actions to undertake for the photocontrol 109 related to light output from the light fixture and related to data communication on the network 115 and photocontrol network 201. The controller 212 may determine light output based on inputs received from a programmed schedule, the various sensors, and/or the RF transceiver 209. For example, based on a programmed schedule, the controller 212 may determine that light output from a light fixture should be dimmed and may initiate the action by signaling a dim driver via DALI to dim the LED lighting element(s) for the light fixture. The controller 212 may be configured via firmware and configuration parameters that can be stored in the photocontrol 109. The configuration for the photocontrol 109, including the programmed schedule, can be modified by a point-to-point session with the remote device 112 (i.e., using the network 115) and/or as instructed via another photocontrol (i.e., using the photocontrol network 201). Likewise, the photocontrol 109 can transmit instructions to other photocontrols, such as instructions from the remote device 112 and/or instructions received from still other photocontrols (i.e., the photocontrol 109 forwarding instructions received as an intermediary).

The status indicator 215 may be made up of one or more components that provide an indication of the status of various functions of the photocontrol 109. For example, the status indicator 215 may comprise a small light, a speaker capable of producing an audible indication, and/or other possible indication mechanisms. In some implementations, the lighting element of the light fixture may also be used as part of the status indicator 215. For example, the lighting element of a light fixture may flash when a communication session is being attempted with the photocontrol 109 managing the light fixture. As another example, the status indicator may be a small LED light that is red when the photocontrol 109 is not communicating with a remote device 112, and is green if a communication session with a remote device 112 is established. The status indicator 215 may further indicate when the photocontrol 109 is and/or is not in communication with another photocontrol, as well as when a configuration of photocontrol is modified.

The temperature sensors 217a-b report the temperature of the light fixture and/or other possible areas such that, among other possible functions, the photocontrol 109 can manage the level of the light output based upon the temperature. The temperature sensor(s) may be implemented using a thermistor or other temperature sensing device, as can be appreciated. In some implementations in which both temperature sensors 217a and 217b are available, the controller 212 may use one of the sensors, such as the external temperature sensor 217b. In some implementations in which only the internal temperature sensor 217a is available, the photocontrol 109 can make dimming decisions based on predicted light fixture temperature. For example, after one hour at 100% brightness, the light fixture is estimated to be 20° C. above the temperature measured by the temperature sensor 217a. The occupancy sensor 219 detects occupancy of an area by people such that, among other possible functions, the photocontrol 109 can manage the level of the light output based upon the occupancy. The occupancy sensor 219 is representative of one or more sensors using infrared (IR), video, ultrasonic, and/or microwave technology, as can be appreciated. Some components employed by the photocontrol 109, such as the various sensors, may be remotely located from the photocontrol.

The data stored in the data store 203 includes, for example, configuration data 231, status data 234, and potentially other data. The configuration data 231 can include the current firmware and/or parameters used to configure components of the photocontrol 109, such as the controller 212; one or more stored configurations (i.e., "profiles") usable for the programming the photocontrol 109 or a photocontrol group; one or more identifiers for the photocontrol 109 and/or light fixture 103; one or more photocontrol group assignments for the photocontrol 109; credentials used to authenticate a remote device 112 and/or other photocontrols; and/or other possible data. The status data 234 includes a record of the state of various components and activities of the photocontrol 109. For example, the status data 234 may include data indicating that the current state of a light of a light fixture is "ON" and dimmed to 70% of the maximum brightness as a result of action by the controller 212 based on input from the light sensor 206 and a schedule using the time of day. As another example, the status data 234 may include data indicating that a firmware update instruction was received for a photocontrol group of which the photocontrol 109 is a member. The data stored in the status data 234 may be stored and read by the various components of the photocontrol 109. In some embodiments, the status data 234 may keep all or a portion of the historical data stored in the status data 234, such as the past actions initiated by the controller 212 for diagnostic or other purposes.

The remote device 112 is representative of the types of remote devices that may be used to communicate with the photocontrol 109 via the network 115. The remote device 112 may comprise, for example, a computer system, such as a smartphone, tablet computer, or other devices with like capability. The remote device 112 may also include a user interface 261, remote transceiver 263, a data store 265, and other possible components. The user interface 261 may comprise, for example, one or more devices such as tactile buttons and/or a display such as a liquid crystal display (LCD), LED display, organic light emitting diode (OLED) display, or other types of display devices. In some implementations, the display may be touch-sensitive. The user interface 261 can provide an indication of the status of various functions of the remote device 112 and photocontrol 109. For example, the user interface 261 may include a display that overlays onto a map each of the photocontrols detected within radio range of the remote device 112.

The data store 265 includes, for example, configuration data 271 and potentially other data associated with the operation of the remote device 112. The configuration data 271 can include one or more stored profiles usable for the programming photocontrols and/or photocontrol groups, various data (model numbers, customer names, light fixture wattage, communication history, location, group assignments, etc.) corresponding to identifiers for the photocontrols 109 and/or light fixtures 103, credentials used to authenticate with photocontrols 109, and/or other possible data.

The remote transceiver 263 comprises a radio module 267, authentication module 269, and other possible components. The radio module 267 provides a wireless network interface to facilitate establishing the network 115 using an RF communication link with the photocontrol 109. The authentication module 269 is used to authenticate the remote device 112 to the photocontrol 109 via the network 115. The authentication module 269 may use one or more credentials stored in the remote device 112 during the course of the authentication.

Next, a description of the exemplary operation of the various components of the communication scenario is provided. To begin, a user of the remote device 112 may provide input to the user interface 261 requesting to discover any nearby photocontrols. Upon receiving the input, the remote device 112 begins identifying any photocontrol devices within range of the remote transceiver 263. The identification process may be carried out according to the one or more protocols supported by the remote transceiver 263, such as Bluetooth, Wi-Fi, etc. In some implementations, photocontrols periodically transmit a respective identifier that may be received by any remote devices 112 within range. In other implementations, the remote device 112 may first transmit a message requesting any photocontrols within range to transmit a respective identifier that may be received by the remote device 112. The identifier transmitted by each of the photocontrol(s) may be representative of one or more pieces of identifying information such as a serial number, a network address, group assignment(s), a model number, a geographic coordinates for its location, an assigned name or other identifier, credentials used for authentication, and/or other types of identifying information for the respective photocontrol and associated light fixture. The user interface 261 may be used to indicate to the user that a search for any nearby photocontrols is underway by, for example, displaying a message.

The photocontrols may also discover other photocontrols according to the one or more protocols supported by the RF transceiver 209, such as Bluetooth, Wi-Fi, etc., which may be the same or different than the protocols used to communicate with the remote device 112. In some implementations, photocontrols periodically transmit a respective identifier that may be received by other photocontrols within radio range. In other implementations, the photocontrols may first transmit a message requesting any other photocontrols within range to transmit a respective identifier. The identifier transmitted by each of the photocontrols may be representative of one or more pieces of identifying information such as a serial number, a network address, group assignment(s), a model number, a geographic coordinates for its location, an assigned name or other identifier, credentials used for authentication, and/or other types of identifying information for the respective photocontrol and associated light fixture.

Figure 3:
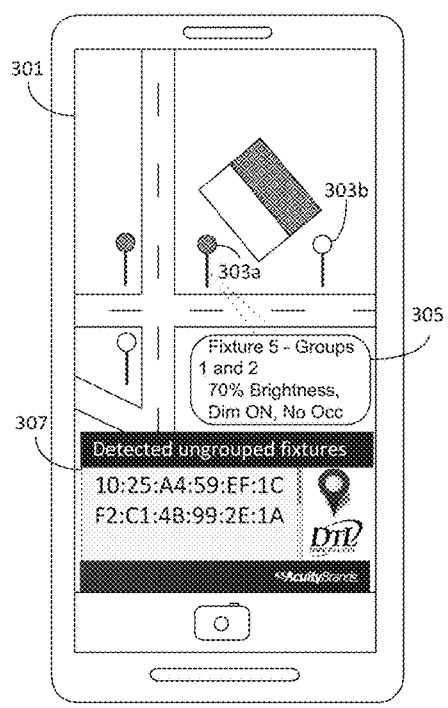
FIGS. 3-8 are pictorial diagrams of an exemplary user interfaces rendered by a remote device in the remote communication scenario of FIG. 2 according to various embodiments of the present disclosure.

In the remote device 112, photocontrols 109 it has discovered may be presented in the user interface 261, such as shown in the exemplary discovery screen of FIG. 3. In some implementations, each photocontrol discovered by the remote device 112 may also provide the remote device with the photocontrols it has discovered through its own photocontrol discovery operations. As a result, the collection of photocontrols 109 "visible" to the remote device 112 can expand beyond the radio range of the remote device 112. In FIG. 3, the discovery screen 301 presents a map of the vicinity of the remote device 112 that includes various markers, such as the marker 303a, each corresponding to a photocontrol in the approximate location as shown on the map. The location shown for each photocontrol 109 may be based on information obtained from the respective photocontrol and/or based on the estimated distance from the current location of the remote device 112. Within the discovery screen 301, a user may select an individual marker for a photocontrol, such as the marker 303a, which then can provide a status panel 305 displaying additional information for the particular photocontrol 109 and the associated light fixture 103. For example, the information may include one or more identifiers, group assignment(s), the current state of the lighting element, a dim level, a synopsis of the current configuration, and/or other possible information.

In some implantations, the discovery screen 301 may modify the markers to distinguish photocontrols based on group assignments or other characteristic, such as the marker color used to distinguish marker 303a from marker 303b. In addition, a notification panel 307 may be placed within the discovery screen 301 to alert a user that newly detected and/or ungrouped photocontrols have been discovered in the vicinity. The notification panel 307 may further provide one or more bits of identifying information for the photocontrol, such a network address and/or other types of information (not shown) such as a model number, serial number, location, etc.

Figure 4:
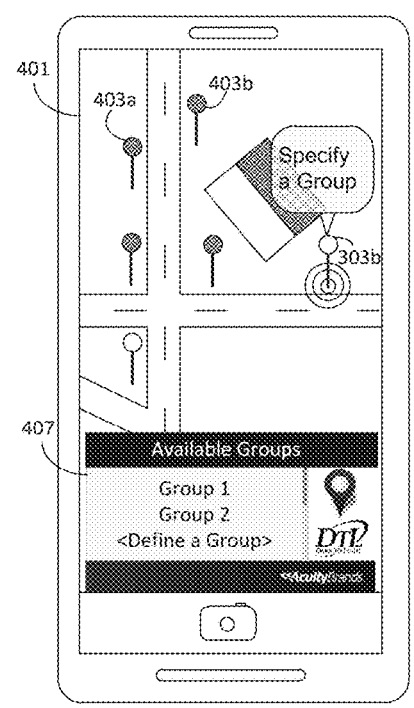

In FIG. 4, the user interface is shown with an exemplary commissioning screen 401. In the commissioning screen 401, a user has selected the marker 303b, corresponding to one of the two ungrouped photocontrols, for assignment to one or more groups. Once a marker for the photocontrol 109 is selected from the discovery screen 301 and/or commissioning screen 401, the remote device 112 may initiate communication with the selected photocontrol 109. In the event the photocontrol 109 is within range of the radio of the remote device 112, the remote device can initiate a point-to-point communication session with the photocontrol 109 by establishing the network 115. In order to establish the communication session with a photocontrol, the remote device 112 may transmit one or more credentials via the network 115. The credential(s) may be, for example, a Bluetooth PIN, a data key, username/password, etc.

Thereafter, the photocontrol 109 may authenticate the credential received from the remote device 112 using the authentication module 224. If the credential is successfully authenticated, the communication session is established between the photocontrol 109 and the remote device 112, via the network 115, as may be acknowledged by the photocontrol 109 (which may now also be referred to as the "connected photocontrol"). Following establishment of the communication session with the photocontrol 109 corresponding to marker 303b, the remote device 112 may receive a listing of photocontrols discovered by the various photocontrols that make up the photocontrol network 201. Included in the list may be photocontrols discovered directly by the photocontrol 109, as well as photocontrols reported to the photocontrol 109 by other photocontrols (i.e., indirectly discovered). For example, as a result of receiving the list from the photocontrol 109, markers 403a-b may be added to the commissioning screen 401 of the remote device 112 that represent additional photocontrols that were not previously discovered by the remote device 112.

Returning to the commissioning screen 401, once the communication session is established, the photocontrol 109 can be assigned to one or more groups displayed in in the group panel 407, where the user can select from existing groups and/or create a new group for the selected photocontrol. In some implementations, once the photocontrol 109 is assigned to an existing group, the photocontrol 109 may be reconfigured according to the configuration used by photocontrols that are members of the group. The group configuration may be transferred to the photocontrol 109 from the remote device 112 and/or via the photocontrol network 201 from other photocontrols that are members of the group.

Figure 5:
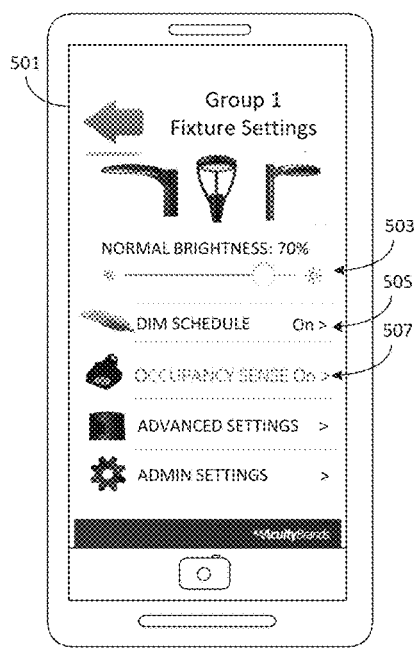

Once the photocontrol 109 is assigned to a group, the user interface 261 of the remote device 112 may also be used to modify the configuration of the photocontrol group, such as can be performed via the exemplary menu screen 501 of FIG. 5. In some implementations, after the communication session is established and the photocontrol is assigned to a group (e.g., Group 1, as shown), the remote device 112 may retrieve the current configuration for the photocontrol group and render the user interface of the remote device to reflect its current configuration state, which may then be adjusted by the user. From the menu screen 501, the remote device 112 may send commands to change the configuration of the group of photocontrols that results in modifications to the light output or other behaviors of the respective light fixtures. The commands may configure and/or override the ambient light sensing logic of the photocontrol device 109, whereby a given portion of the configuration may be effective during defined time periods or upon occurrence of particular events, such as upon detection of an occupant. As noted previously, photocontrols may be a member of one or more groups. In the event that, for example, a given photocontrol is a member of two groups that each have different configurations, the given photocontrol can be configured according to the most recently received configuration.

The individual configuration changes (e.g., enabling/disabling a feature) made by the user may be individually transmitted to the photocontrol 109 as the configuration change is made, or one or more changes may be transmitted to the photocontrol 109 as a batch periodically and/or as directed by the user. Upon receiving a configuration change from the remote device 112, the photocontrol 109 may use the photocontrol network 201 to instruct other photocontrols within the same group to make the same configuration change. The photocontrol 109 may provide a confirmation of configuration changes received from the remote device 112 by sending a confirmation message to the remote device 112 via the communication session, as well as possibly providing a visual and/or audible confirmation at the light fixture 103 managed by the photocontrol 109. Each photocontrol 109 may locally store its respective configuration and group configuration(s), while the remote device 112 may also retain copies of configurations of photocontrols and groups with which it has been in communication.

In some implementations, the photocontrols may offer dimming functionality whereby the brightness of the light output from the light fixture may be adjusted incrementally rather than the light output being either fully 'on' or fully 'off'. Using a previously established communication session, the remote device 112 may also send dimming commands and/or dimming schedules to the group of photocontrols via the photocontrol 109. For example, using the brightness adjustment 503 of the menu screen 501, a user can adjust the brightness level used for normal ("default") operating conditions in which light output is needed from the lighting fixtures (e.g., at night) that are managed by the photocontrols of the group. Additional programming options based on a schedule, occupancy, etc., may also override this default setting.

Figure 6:
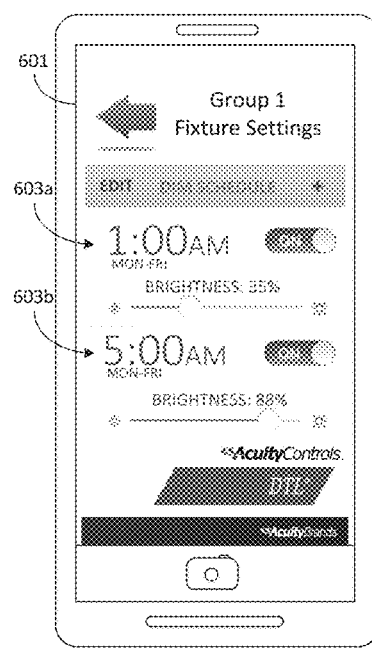

By selecting the dim schedule 505 from the menu screen 501, the user is presented with a scheduling interface, such as the exemplary scheduling screen 601, shown in FIG. 6. Using the scheduling screen 601, a user of the remote device 112 can program one or more schedule events 603 based on the time of day, including the date and/or day of the week. For example, the user has created event 603a to set the brightness level to 35% at 1 A.M., Monday-Friday, which would persist until the event 603b that sets the brightness level to 88% beginning at 5 A.M., Monday-Friday. In the exemplary scheduling screen 601, the events 603 would function to override the default brightness level, such as set using the previously described brightness adjustment 503 in FIG. 5. As explained above, upon receiving a configuration change from the remote device 112, the photocontrol 109 may use the photocontrol network 201 to instruct other photocontrols within the same group to make the same configuration change.

The brightness levels in the events 603 and in other screens of the remote device 112 may be adjusted using various techniques. One technique may adjust the light output to an absolute level, such as a command to make the brightness level be 40% of the maximum output or a command to switch to one of many possible preset brightness levels, such as a preset twilight output level or a preset evening output level. Another technique may adjust the brightness relative to the current light brightness level, such as a command to increase the current brightness by 20%, reduce the current brightness by 50%, etc.

In some implementations, the photocontrols may provide occupancy sensing functionality for the respective light fixtures that may be configured by selecting the occupancy sense feature 507 from the menu screen 501 of FIG. 5. For example, as shown in the occupancy screen 701 of FIG. 7, the photocontrols of the group may be programmed using the occupancy brightness adjustment 703 to set the light output from respective light fixtures at 68% when ambient light level falls below a threshold (e.g., during the evening) and occupants have been detected in the vicinity. Continuing this example, the photocontrols in the group may then retain this brightness level after detection of occupants for 25 minutes, as configured by the timeout 706. Thereafter, the brightness of the light output may return to the configured level after the timeout period expires. By enabling the group response feature 709 for the group of photocontrols, detection of a person by any of the photocontrols in the group can result in all of the photocontrols responding to the detection by, for example, increasing the brightness of the respective light fixtures (also referred to as "group response"). For example, if all photocontrols for light fixtures along a path are in a photocontrol group with group response enabled, if any of the photocontrols along the path detects a person, the brightness of all of the light fixtures along the path will be increased. The detecting photocontrol may notify the other photocontrols in the group via the photocontrol network 201. In some implementations, the group response feature can be disabled such that occupancy detection by a photocontrol group member only results in that photocontrol responding.

Figure 7:
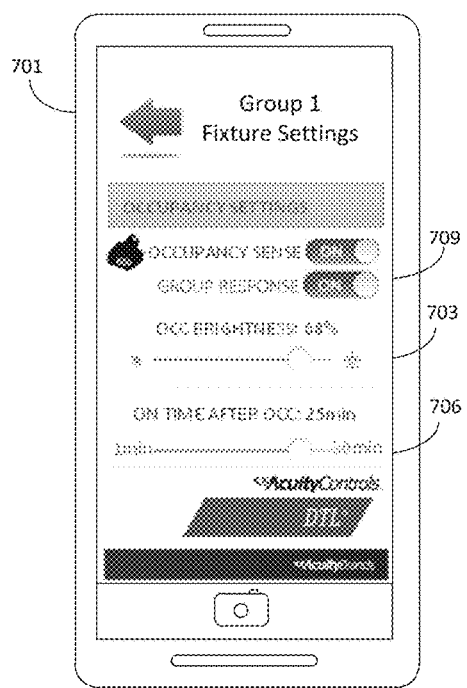

The photocontrol group may further be programmed with criteria (not shown) for which the occupancy sensing functionality is enabled or disabled, different timeout periods, different actions to be undertaken, etc. For example, the occupancy sensing functionality may be disabled until from 6 A.M.-10 P.M., such that the brightness is not adjusted based on occupancy during this period. From 10 P.M.-6 A.M., the brightness may be modified by the occupancy sensor to a programmed level based on the detected occupancy of the area. In another exemplary implementation, the occupancy sensing functionality is enabled during time periods in which the brightness level for the light fixture is set to less than the occupancy brightness level (e.g., 68% as shown in FIG. 7). In this manner, the occupancy sensing functionality can be used to ensure a minimum brightness level when occupants are detected, while also not reducing the brightness when the brightness exceeds the occupancy brightness level. The criteria for the enabled or disabled periods, timeout periods, the actions undertaken, and other programming of the photocontrol group may be modified by a user using the remote device 112.

In further implementations, the photocontrols may provide temperature protection (also referred to as "temperature foldback") functionality for the light fixtures. When the lighting element of a light fixture is operating in extreme temperatures, the longevity of the lighting element may be reduced. In these environments, the lifetime of the lighting element may be extended by adjusting the brightness of the light output from the lighting elements during these temperature extremes. To this end, the photocontrols may include one or both temperature sensors 217a-b measuring the temperature of the respective light fixture and/or the ambient air temperature. The photocontrols may be programmed to initiate a particular action based upon the detected temperature meeting or exceeding a determined threshold. The photocontrols may be further programmed to initiate additional actions if the temperature of the light fixture 103 fails to respond to the previous actions.

For example, the photocontrol 109 may be configured to reduce the light output from the light fixture 103 to no more than 50% of the maximum light output if the temperature of the light fixture 103 exceeds 120° F. The programming of the photocontrol 109 may further reduce the light output from the light fixture 103 to no more than 25% of the maximum light output if the temperature of the light fixture 103 remains above 120° F. for five minutes after the previous action. The threshold temperatures, the actions undertaken, and other programming of the photocontrol 109 may be modified by a user using the remote device 112.

In still further implementations, the remote device 112 can save all or portions of a configuration for a photocontrol and/or a photocontrol group as a profile, which can then later be applied to other photocontrols and/or photocontrol groups by the remote device 112. For example, once the configuration of the photocontrol 109 is configured as desired by the user, the configuration can be saved by the user as one of the various profiles that can be stored on the remote device 112. In variations of these implementations, saving a profile may store defined portions of a profile, such as only dimming schedules, the complete configuration except group-specific and/or device-specific identifiers (names, network addresses, etc.), and/or other possibilities. In addition, the profile and/or an identifier for the profile may also be stored on a photocontrol. In this manner, another user, possibly with a different remote device, can quickly determine or confirm the complete configuration of a given photocontrol and/or photocontrol group by identifying the name of the configuration profile that the photocontrol is configured with (e.g., "Street Profile"). Similarly, the profiles stored on the remote device 112 may be used to apply all or portions of a configuration to one or more photocontrols and/or photocontrol groups, thereby obviating the need for the user to step through each individual configuration change that would otherwise be performed on each of the photocontrols and/or photocontrol groups to be configured.

Figure 8:
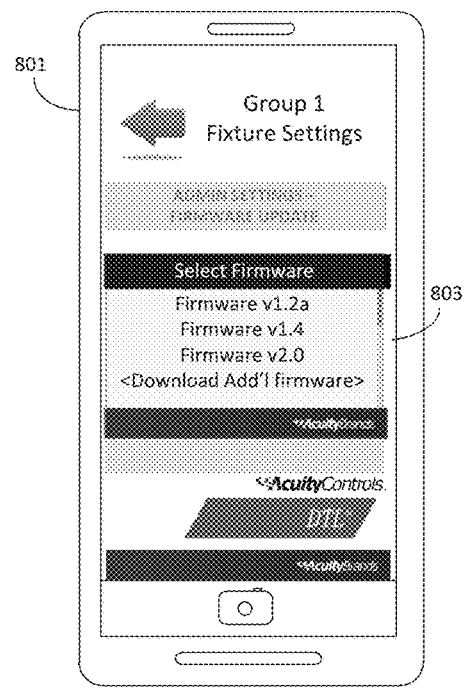

In various implementations, the remote device 112 can initiate firmware updates for the photocontrols in a group via the exemplary update screen 801 of FIG. 8. The firmware to be applied may be stored in the remote device 112, in one of the photocontrols, and/or may be retrieved by the remote device 112 from an external source. The update panel 803 may present the firmware versions currently available to be applied, from which the user can select a firmware to be applied to the photocontrols of the group. Once the firmware update instruction, that possibly includes the firmware file itself, is received by the photocontrol in communication with the remote device 112, the firmware update instruction is transmitted to the photocontrol group members via the photocontrol network 201, where they will each perform the update. In addition to the possible features of the photocontrols and the remote device disclosed herein, other features are possible, such as disclosed in U.S. patent application Ser. No. 14/748,659 filed Jun. 24, 2015, the contents of which are incorporated herein by reference.

It should be noted that while the examples above involve modifications to one photocontrol group configuration, the remote device 112 can similarly make adjustments to other group configurations defined for the photocontrols in use in the photocontrol network 201. Furthermore, the particular photocontrol with which the remote device 112 has established the communication session (i.e., the connected photocontrol) need not be a member of the photocontrol group for which the configuration is being modified by the remote device 112. A modification to a group configuration and/or to an individual photocontrol configuration that is not applicable to the connected photocontrol will be transmitted by the connected photocontrol, via the photocontrol network 201, to the one or more photocontrols to which the modification is addressed. In some implementations, the modification made by a remote device 112 to a configuration for a photocontrol group or for an individual photocontrol may include a destination address that identifies the respective photocontrol group or the individual photocontrol.

Figure 9:
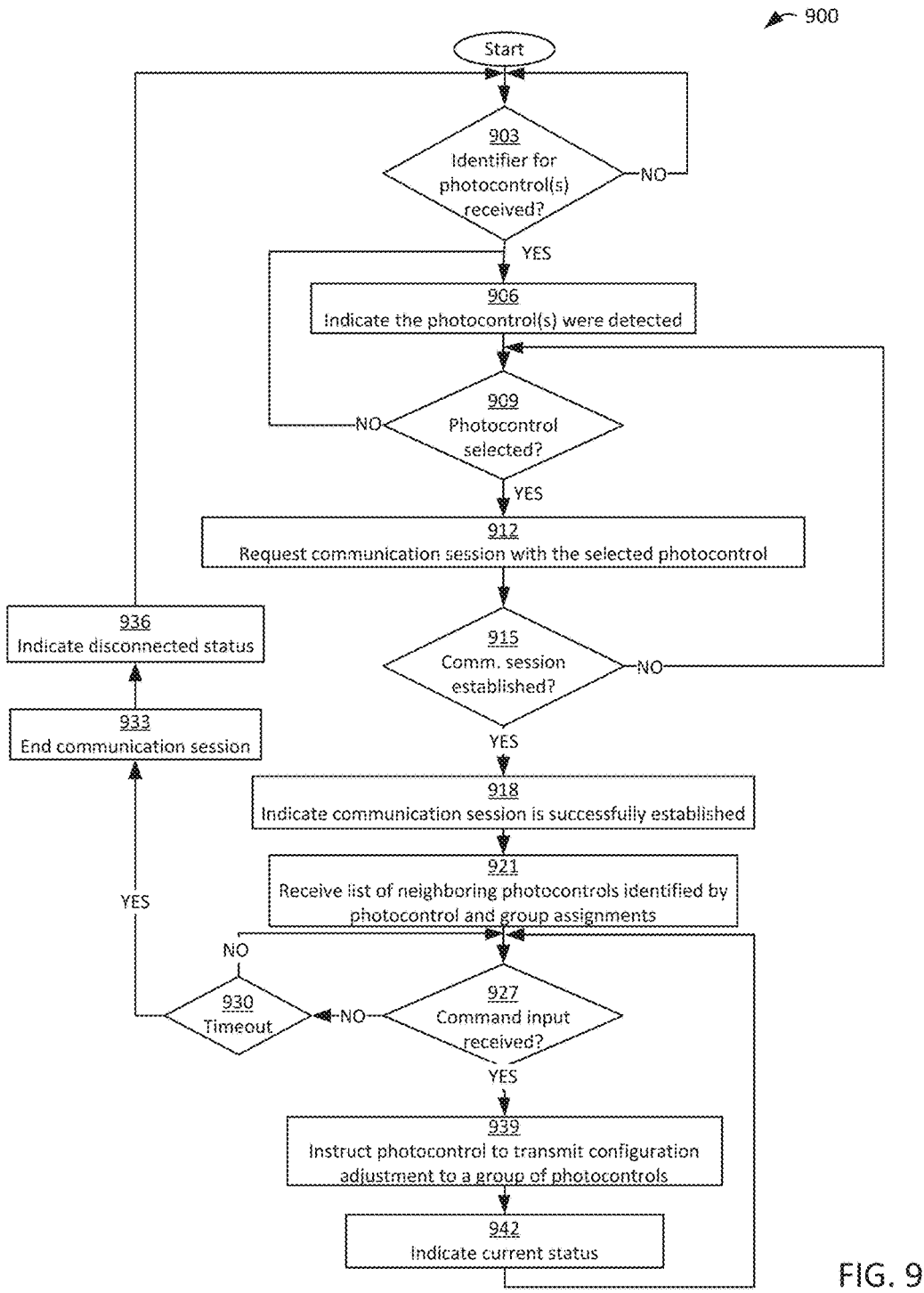
FIG. 9 is a flowchart illustrating one example of functionality implemented as portions of a remote device implemented in the remote communication scenario of FIG. 2 according to various embodiments of the present disclosure.

Moving on to FIG. 9, shown is a flowchart that provides one example of the operations for a method 900 of the remote device 112 in the remote communication scenario 200 according to various embodiments. It is understood that the flowchart of FIG. 9 provides merely an example of the many different types of functional arrangements that may be employed to implement the operations of the method 900 as described herein. The operations depicted in the flowchart of FIG. 9 may be initiated once the remote device 112 is available for communication.

Beginning with block 903, the remote device 112 may determine whether an identifier has been received from any photocontrol devices, such as the photocontrol 109, within range of the remote transceiver 263 of the remote device. The identification process may be carried out according to the one or more protocols supported by the remote transceiver 263, such as Bluetooth, Wi-Fi, etc. In some implementations, photocontrols periodically transmit a respective identifier that may be received by any remote devices 112 within range. In other implementations, the remote device 112 may first transmit a message requesting any photocontrols within range to transmit a respective identifier that may be received by the remote device 112. The identifier transmitted by each of the photocontrol(s) may be representative of one or more pieces of identifying information such as a serial number, a network address, group assignment(s), a model number, a geographic coordinates for its location, an assigned name or other identifier, credentials used for authentication, and/or other types of identifying information for the respective photocontrol 109 and associated light fixture 103.

Next, in block 906, any photocontrols discovered are presented in the user interface 261 of the remote device 112. The user interface 261 may be updated periodically as the various photocontrols are detected. In some implementations, the user interface presents a map of the vicinity of the remote device 112 that includes various markers, where the location of each of the markers corresponds to the location of a photocontrol. The location for each photocontrol may be based on information obtained from the photocontrol, based on the location stored in the remote device 112, and/or based on the estimated distance from the current location of the remote device 112. Through the user interface 261, a user may select an individual marker for a particular photocontrol, such as the photocontrol 109, in order to initiate a communication session with which to configure the photocontrol.

Then, in block 909, the method 900 determines whether a photocontrol is selected with which a communication session should be initiated. If not, execution of the method 900 returns to block 906. Alternatively, if a photocontrol has been selected, in block 912, the remote device 112 may request to establish a point-to-point communication session with the selected photocontrol 109. In order to establish the communication session with the photocontrol 109, the remote device 112 may transmit one or more credentials via a wireless network interface. The credential(s) may be, for example, a Bluetooth PIN, a data key, username/password, etc. Establishing the communication session may be carried out by establishing a network 115 with the selected photocontrol 109, but may, in some implementations, require additional authentication and/or encryption operations beyond what is necessary to establish the network 115.

For example, if the remote device 112 is communicating with the photocontrol 109 via Bluetooth, the communication session may be established when the network 115 is established using a Bluetooth PIN as an authentication credential. As another example, if the remote device 112 is communicating with the photocontrol 109 via unencrypted Wi-Fi, the network 115 may be implemented using Wi-Fi, while the authentication for the communication session may be implemented as another layer atop the network 115. In some implementations, the communication session may also implement encryption in order to retain confidentiality of the credential(s) during transmission between the remote device 112 and the photocontrol 109. The encryption may be carried out using the Advanced Encryption Standard (AES), Triple Data Encryption Standard (3-DES), etc.

When the photocontrol 109 has successfully authenticated the credential, a confirmation message may be sent to the remote device 112 to confirm establishment of the communication session. Subsequently, in block 915, the remote device 112 determines whether the confirmation message has been received indicating that the communication session has been successfully established. If the communication session was not successfully established, execution of the method 900 returns to block 909. Alternatively, if the confirmation message has been received, in block 918, the remote device 112 may indicate, via the user interface, that the communication session has been established. In some implementations, the indication of a successfully established session is an absence of any error or failure message. In other implementations, the successful indication may further include presentation status information for the photocontrol 109 and/or the associated light fixture(s).

Next, in block 921, the remote device 112 may receive a listing from the photocontrol 109 with which the communication session is established (also referred to as the connected photocontrol) of other photocontrols that make up the photocontrol network 201. Included in the list may be photocontrols discovered directly by the photocontrol 109, as well as photocontrols reported to the photocontrol 109 by other photocontrols (i.e., indirectly discovered). Then, in block 927, the remote device 112 determines if input for a command was received through the user interface 261 to change the configuration of a photocontrol or photocontrol group, such as modifying lighting setting, changing a firmware version, changing a photocontrol group assignment, etc. If no input was received, in block 930, the remote device 112 determines whether a time out has occurred. Alternatively, if input was received, execution of the method 900 proceeds to block 939. In block 930, if a timeout has not occurred, then execution of the method 900 returns to block 927. If a timeout has occurred, in block 933, the remote device 112 may terminate the communication session with the photocontrol 109. Thereafter, in block 936, the remote device 112 may indicate the disconnected state, then enter a sleep state. Once input is again received through the user interface 261, the remote device 112 may wake and return to block 903.

Returning to block 939 where input for a command was timely received through the user interface 261, the command may be transmitted to the connected photocontrol 109 via the communication session. In the event that the configuration change is directed to a photocontrol group, upon receiving the configuration change from the remote device 112, the connected photocontrol receiving the change may use the photocontrol network 201 to instruct other photocontrols within the group to make the configuration change. The individual configuration changes (e.g., configuring a feature) made by the commands may be individually transmitted to the connected photocontrol 109 as the configuration change is made, or one or more changes may be transmitted to the connected photocontrol as a batch periodically and/or as directed by the user.

As noted above, while the connected photocontrol 109 may be a member of one or more groups, the remote device 112 can make adjustments to other group configurations defined for photocontrols in use in the photocontrol network 201 and is not limited to adjustments only to groups to which the connected photocontrol belongs. A modification to a group configuration and/or to an individual photocontrol configuration received by the connected photocontrol will be transmitted via the photocontrol network 201 to the one or more photocontrols to which the modification is addressed. In some implementations, the modification made by a remote device 112 to a configuration for a photocontrol group or for an individual photocontrol may include a destination address that identifies the respective photocontrol group or the individual photocontrol. Next, in block 942, the remote device 112 may indicate the result of the command via the user interface 261, where the result is received as a confirmation message from the photocontrol 109. Thereafter, execution of the method 900 may return to block 927.

Figure 10:
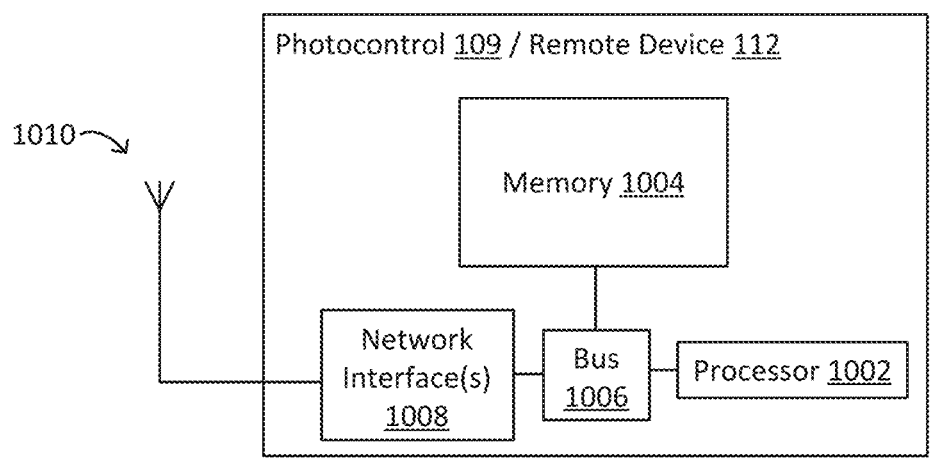
FIG. 10 is a schematic block diagram that provides one example illustration of a photocontrol device/remote device employed in the remote communication scenario of FIG. 2 according to various embodiments of the present disclosure.

Next, in FIG. 10, shown is a block diagram depicting an example of a photocontrol 109/remote device 112 used for implementing the techniques disclosed herein within a lighting environment 100. The photocontrol 109/remote device 112 can include a processing device 1002. Non-limiting examples of the processing device 1002 include a microprocessor, an application-specific integrated circuit ("ASIC"), a state machine, or other suitable processing device. The processing device 1002 can include any number of processing devices, including one. The processing device 1002 can be communicatively coupled to computer-readable media, such as memory device 1004. The processing device 1002 can execute computer-executable program instructions and/or access information respectively stored in the memory device 1004.

The memory device 1004 can store instructions that, when executed by the processing device 1002, cause the processing device 1002 to perform operations described herein. The memory device 1004 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, and the like.

The photocontrol 109/remote device 112 can include a bus 1006 that can communicatively couple one or more components of the corresponding device. Although the processor 1002, the memory 1004, and the bus 1006 are depicted in FIG. 10 as separate components in communication with one another, other implementations are possible. For example, the processor 1002, the memory 1004, and the bus 1006 can be components of printed circuit boards or other suitable devices that can be disposed in a photocontrol 109 and remote device 112 to store and execute programming code.

The photocontrol 109/remote device 112 can also include one or more network interface devices 1008. Each network interface device 1008 can be a module in a transceiving device, a separate transceiving device, or a mix of both, configured for wireless communication via an antenna 1010. A non-limiting example of the network interface device 1008 is an RF transceiver and can include one or more components for establishing communication sessions via the network 115.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multi-purpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

Therefore, the following is claimed:

1. A remote device for configuring a grouping of photocontrol devices to manage light output of respective light fixtures, comprising:
   a processor;
   a wireless network interface; and
   a memory configured with instructions that, when executed by the processor, cause the remote device to:
   receive, via the wireless network interface, an identifier from a photocontrol device within range of the wireless network interface of the remote device, the photocontrol device managing light output of the light fixture, the photocontrol device being removably attached to the light fixture;
   transmit, via the wireless network interface, a request to establish a point-to-point communication session directly with the photocontrol device using the wireless network interface, the request comprising an authentication credential; and
   upon receiving, via the wireless network interface, an acknowledgement from the photocontrol device confirming establishment of the point-to-point communication session, use the established point-to-point communication session for:
   receiving a list of a plurality of photocontrols discovered via an RF transceiver of the photocontrol device that accesses a photocontrol network, wherein the list specifies identifiers and group assignments for the photocontrols, the photocontrols managing light output of respective light fixtures; and
   in response to input received, via a user interface of the remote device, to adjust a dimming schedule for a group of the photocontrols, instructing the photocontrol device to transmit, via the RF transceiver for the photocontrol network, an adjustment to a configuration for the group of the photocontrols based on the received input, wherein the configuration for the group specifies the dimming schedule for the photocontrols that are members of the group.

2. The remote device of claim 1, wherein the remote device communicates with the photocontrol device using Bluetooth, and the photocontrol device communicates with other ones of the photocontrols via the photocontrol network using one of more of IEEE 802.11 and IEEE 802.15 families of standards.

3. The remote device of claim 1, wherein the photocontrol network is formed by the photocontrols that are organized in a star configuration; and
   said transmitting the adjustment to the configuration for the group of the photocontrols comprises forwarding the adjustment to one or more photocontrols in the photocontrol network that are not in the group of photocontrols.

4. The remote device of claim 1, wherein the configuration specifies that all of the photocontrols in the group respond when any of the photocontrols use an occupancy sensor to detect a person, wherein the detecting photocontrol notifies other photocontrols in the group via the photocontrol network.

5. The remote device of claim 1, wherein the instructions further cause the remote device to, in response to input received via the user interface of the remote device to install a firmware update for a group of the photocontrols, instruct the photocontrol device to transmit, via the RF transceiver for the photocontrol network, the firmware update to be installed by the photocontrols that are members of the group.

6. The remote device of claim 1, wherein the instructions further cause the remote device to render, via the user interface of the remote device, interface elements corresponding to various portions of the configuration received for the photocontrol device, wherein the interface elements are responsive to input received to modify the configuration.

7. The remote device of claim 1, wherein the instructions further cause the remote device to:
   render, in the user interface of the remote device, interface elements corresponding to the photocontrols and the respective group assignments; and
   in response to input received, via the user interface of the remote device, to modify membership of the group of photocontrols, instruct the photocontrol device to transmit, via the RF transceiver for the photocontrol network, the modification to the photocontrols of the group.

8. A method for lighting control of a grouping of light fixtures by a remote device, the method comprising:
   receiving, via a wireless network interface, an identifier from a photocontrol device within range of the wireless network interface of the remote device, the photocontrol device managing light output of the light fixture, the photocontrol device being removably attached to the light fixture;
   transmitting, via the wireless network interface, a request to establish a point-to-point communication session directly with the photocontrol device using the wireless network interface, the request comprising an authentication credential; and
   upon receiving, via the wireless network interface, an acknowledgement from the photocontrol device confirming establishment of the point-to-point communication session, using the established point-to-point communication session for:
   receiving a list of a plurality of photocontrols discovered via an RF transceiver of the photocontrol device that accesses a photocontrol network, wherein the list specifies identifiers and group assignments for the photocontrols, the photocontrols managing light output of respective light fixtures; and
   in response to input received, via a user interface of the remote device, to adjust a dimming schedule for a group of the photocontrols, instructing the photocontrol device to transmit, via the RF transceiver for the photocontrol network, an adjustment to a configuration for the group of the photocontrols based on the received input, wherein the configuration for the group specifies the dimming schedule for the photocontrols that are members of the group.

9. The method of claim 8, wherein the remote device communicates with the photocontrol device using Bluetooth, and the photocontrol device communicates via the photocontrol network with other ones of the photocontrols using one of more of IEEE 802.11 and IEEE 802.15 families of standards.

10. The method of claim 8, wherein the configuration specifies that all of the photocontrols in the group respond when any of the photocontrols use an occupancy sensor to detect a person, wherein the detecting photocontrol notifies other photocontrols in the group via the photocontrol network.

11. The method of claim 8, further comprising rendering, via the user interface of the remote device, interface elements corresponding to various portions of the configuration for the photocontrol device, wherein the interface elements are responsive to input received to modify the configuration.

12. The method of claim 8, wherein the photocontrol network is a mesh network formed by the photocontrols; and
   said transmitting the adjustment to the configuration for the group of the photocontrols comprises forwarding the adjustment to one or more photocontrols in the photocontrol network that are not in the group of photocontrols.

13. The method of claim 8, further comprising:
   in response to input received, via the user interface of the remote device, to install a firmware update for a group of the photocontrols, instructing the photocontrol device to transmit, via the RF transceiver, the firmware update to be installed by the photocontrols that are members of the group.

14. The method of claim 8, wherein, based at least in part upon the identifier from the photocontrol device, the remote device determines attributes associated with the photocontrol device including one or more of: a model number of the photocontrol device, a model number of the light fixture, a manufacture date for the photocontrol device, a manufacture date for the photocontrol device, a wattage of the light fixture, and a customer name.

15. The method of claim 8, further comprising:
   rendering, in the user interface of the remote device, interface elements corresponding to the photocontrols and the respective group assignments; and
   in response to input received, via the user interface of the remote device, to modify membership of the group of photocontrols, instructing the photocontrol device to transmit, via the RF transceiver for the photocontrol network, the modification to the photocontrols of the group.

16. A non-transitory computer-readable medium embodying a program executable in a remote device to provide lighting control of a grouping of light fixtures, the program comprising code for:

receiving, via a wireless network interface, an identifier from a photocontrol device within range of the wireless network interface of the remote device, the photocontrol device managing light output of the light fixture, the photocontrol device being removably attached to the light fixture;

transmitting, via the wireless network interface, a request to establish a point-to-point communication session directly with the photocontrol device using the wireless network interface, the request comprising an authentication credential; and upon receiving, via the wireless network interface, an acknowledgement from the photocontrol device confirming establishment of the point-to-point communication session, using the established point-to-point communication session for:

receiving a list of a plurality of photocontrols discovered via an RF transceiver of the photocontrol device that accesses a photocontrol network, wherein the list specifies identifiers and group assignments for the photocontrols, the photocontrols managing light output of respective light fixtures; and in response to input received, via a user interface of the remote device, to adjust a dimming schedule for a group of the photocontrols, instructing the photocontrol device to transmit, via the RF transceiver for the photocontrol network, an adjustment to a configuration for the group of the photocontrols based on the received input, wherein the configuration for the group specifies the dimming schedule for the photocontrols that are members of the group.

17. The non-transitory computer-readable medium of claim 16, wherein the configuration specifies that all of the photocontrols in the group respond when any of the photocontrols use an occupancy sensor to detect a person, wherein the detecting photocontrol notifies other photocontrols in the group via the photocontrol network.

18. The non-transitory computer-readable medium of claim 16, wherein the remote device communicates with the photocontrol device using Bluetooth, and the photocontrol device communicates with other ones of the photocontrols via the photocontrol network using one of more of IEEE 802.11 and IEEE 802.15 families of standards.

19. The non-transitory computer-readable medium of claim 16, wherein the program further comprises code for, in response to input received via the user interface of the remote device to install a firmware update for a group of the photocontrols, instructing the photocontrol device to transmit, via the RF transceiver for the photocontrol network, the firmware update to be installed by the photocontrols that are members of the group.

20. The non-transitory computer-readable medium of claim 16, wherein the photocontrol device is a member of a second group of photocontrols and is also a member of the first group of photocontrols.

* * * * *